United States Patent [19]

Günther et al.

[11] 4,227,609

[45] Oct. 14, 1980

[54] BUCKET CONVEYOR

[75] Inventors: Roland Günther, Wesel; Karl H. Koster, Essen, both of Fed. Rep. of Germany

[73] Assignee: Gutehoffnungshütte Sterkrade A.G., Fed. Rep. of Germany

[21] Appl. No.: 18,861

[22] Filed: Mar. 9, 1979

[51] Int. Cl.³ .................... B65G 17/36; B65G 25/00
[52] U.S. Cl. ................................ 198/711; 198/648
[58] Field of Search ............... 198/711, 709, 712, 698, 198/728, 731, 801, 648, 701, 699, 702

[56] References Cited

U.S. PATENT DOCUMENTS

| | | | |
|---|---|---|---|
| 17,842 | 8/1903 | Jackson | 198/711 |
| 567,683 | 9/1896 | Marvel | 198/711 |
| 1,087,848 | 2/1914 | Studer | 198/699 |
| 2,873,844 | 2/1959 | Curtiss | 198/711 |

*Primary Examiner*—Joseph E. Valenza
*Assistant Examiner*—Brian Bond

*Attorney, Agent, or Firm*—McGlew and Tuttle

[57] ABSTRACT

A bucket conveyor comprises a drive pulley and at least one guide pulley with endless traction cable means engaged over the guide pulley and the drive pulley. A bucket member or a conveyor trough has an axle thereon on each side and with a pulley on the axle. In one embodiment the pulley is pivotal on the axle and in another embodiment the pulley is fixed on the axle. In addition, the construction includes a guide pin on the trough on each side of the axle and the endless traction cable is trained around each guide pin and has a loop engaged over the pulley between the pins. In this manner the endless cable is guided between the drive pulley and the guide pulley and around the pin of each bucket and over the bucket pulley on an axle of the bucket and around the pin on the opposite side of the bucket pulley. The construction is applicable both for a fixed bucket in respect to the traction cable or a bucket that pivots or swings in respect thereto and in which the bucket pulley is rotatable on its bucket axle.

6 Claims, 5 Drawing Figures

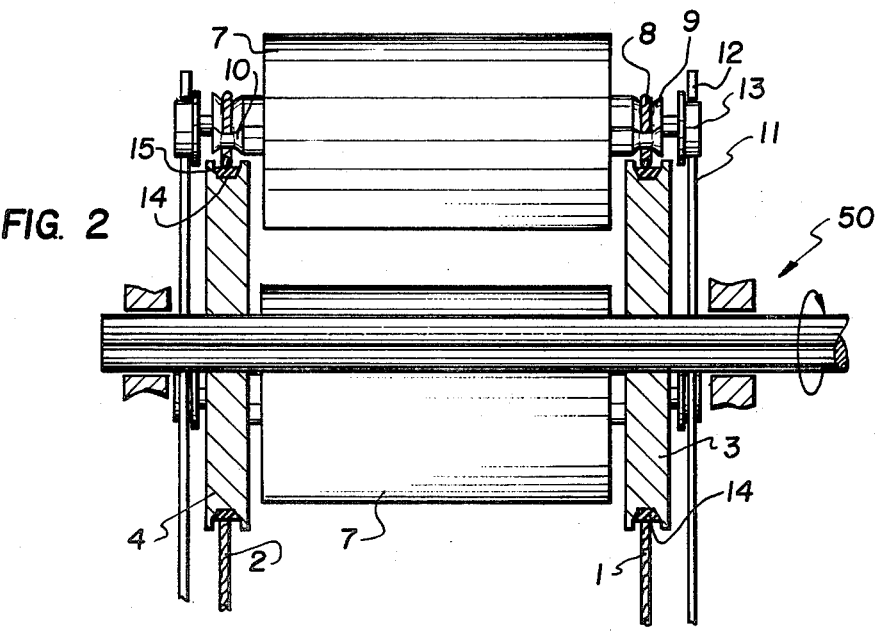
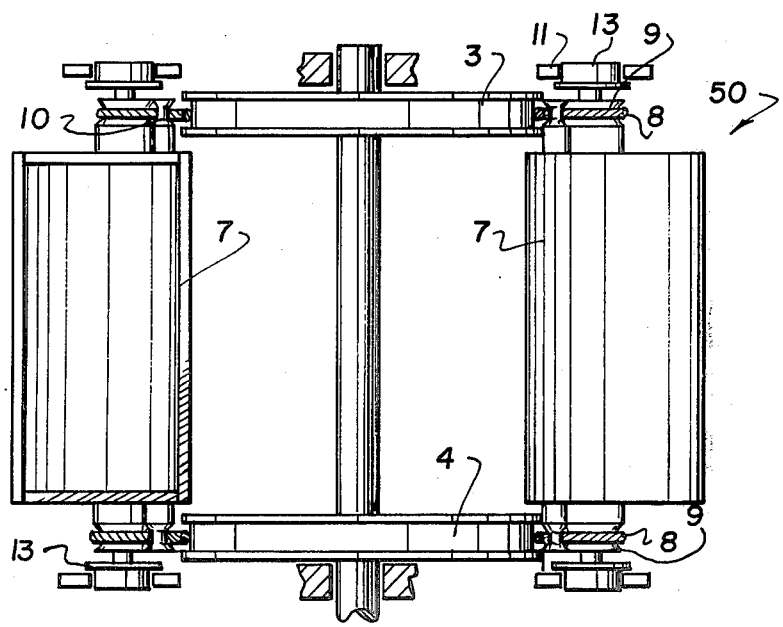

BUCKET CONVEYOR

BACKGROUND OF THE INVENTION

1. Field of the Invention

The invention relates in general to conveyors and in particular to a new and useful bucket conveyor having an endless traction drive cable which is guided over drive and guide pulleys and around spaced apart guide pins and bucket pulleys of each bucket carried by the traction cable.

2. Description of the Prior Art

Bucket conveyors are mostly used to transport bulk material in vertical or horizontal directions, a constantaly pulsating material current being achieved with a plurality of buckets, troughs or pockets. The buckets, troughs or pockets receiving the material to be conveyed are secured on endless traction means or endless conveyors and form with the conveyors a barrow tram. In the presently known designs, the traction means comprise either chains of various design or traction belts with or without inserts. Thus German Pat. Nos. 528,451 and 173,388 show belt conveyors and the fastening of the buckets on the latter, while German Pat. No. 625,808 and DOS 1,556,173 show chains as a traction means in bucket conveyors.

For the heavy-duty bucket conveyors required today, these designs are not longer suitable. The conveyor current sizes under discussion today start at 500 t/h, and are already at 1000 t/h, and will far exceed this size in the future (1600 t/h). Here belts as traction means are no longer sufficient. The belt thickness necessary for higher conveyor volumes considerably increases the existing dead loads. The drum diameters must likewise be increased at the expense of added weight. The fastening of the buckets on the belt becomes more difficult.

The use of chain traction means can be eliminated from the beginning, because the increased output of a bucket conveyoer can be achieved substantially only by increasing the conveying speed. Round link chains permit only speeds of up to a maximum of 0.8 m/s, sprocket chains up to a maximum of 2.5 m/s. With these speeds the chains are soon worn out. At higher speeds the use of chains is no longer economically feasible.

SUMMARY OF THE INVENTION

The invention suggets that the traction means consist of two cables or ropes each driven positively by means of a driving pulley, on which the conveyor troughs are secured. The conveyor troughs can also be arranged between the traction means and be pivotable. The conveyor troughs are secured to the ropes by bending off the traction ropes from the direction of traction. The driving pulleys are provided with grooves, which can be lined with a driving pulley lining.

This design of a bucket conveyor according to the invention has considerably advantages over the present designs. The main advantage resides in considerable savings in weight, which are achieved by the use of ropes and traction ropes in the entire construction, including the supporting construction. This also permits great conveying heights. Higher conveying speeds are achieved by utilizing the looping angle necessary in rope drives, and by utilizing the increase of the friction value between rope and pulley by the lined grooves, similar to that of a so-called Koepe pulley. It is of advantage if a reversal is designed in this system to be tensionable. The operating principle suggested according to the invention also permits a so-called internal discharge of the buckets or troughs,, which is not possible in band conveyoers, because of the band and the driving drum. While a limiting speed has been attained at which an orderly centrifugal discharge of the troughs can still be expected, an increase of the conveying speed is only possible by a different shape of the troughs, which can then extend between the traction means. With a hinged bucket fastening between the traction means, the suggested principle can also be used for pendulum bucket conveyoers. This way any direction of lines is possible in bucket conveyors, e.g. in a horizontal direction. The fastening of the troughs on the rope permits an unhindered run over the driving pulleys.

Summarizing, it can be said that the existing parameters of the bucket conveyors can be improved within wide limits by the design according to the invention. This is particularly true for higher material currents, for overall dimensions, lower weights and lower costs.

In accordance with the invention there is provided a belt conveyor which comprises a drive pulley and at least one guide pulley with an endless traction cable engaged over the drive pulley and the guide pulley and over a guide pin and a conveyor trough pulley is mounted on an axle of each conveyor trough or bucket and then over an opposite guide pin on the opposite side of the trough pulley and wherein the buckets have trough pulleys which are either rotatable on the bucket axle or fixed thereto.

A further object of the invention is to provide a bucket conveyor which is simple in design, rugged in construction and economical to manufacture.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

BRIEF DESCRIPTION OF THE DRAWINGS

In the Drawings:

FIG. 2 is a section taken along the line II—II of FIG. 1;

FIG. 3 is a section taken along the line III—III of FIG. 1;

GENERAL DESCRIPTION OF THE PREFERRED EMBODIMENTS

Figure 1:
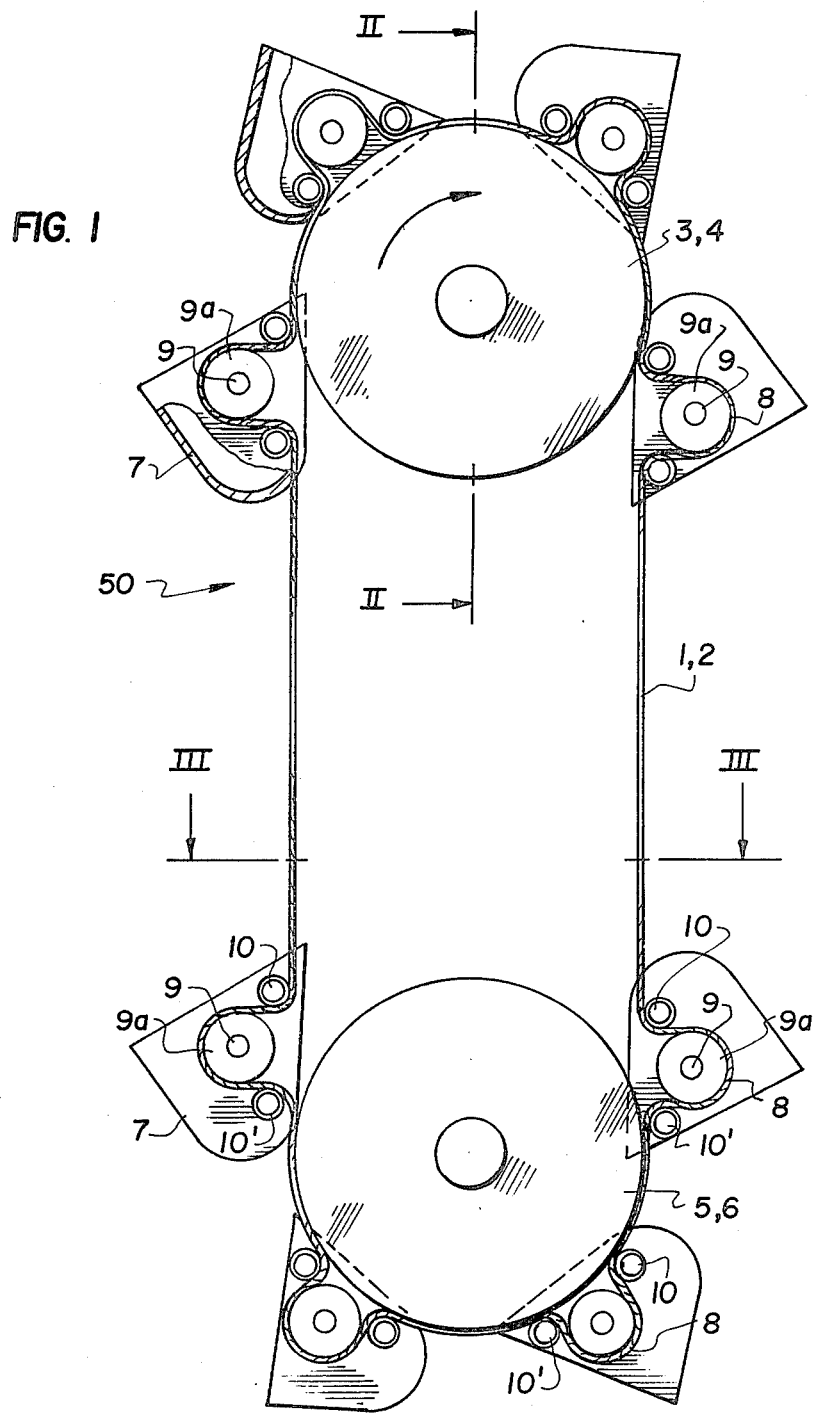
FIG. 1 is a side elevational view of a bucket conveyor constructed in accordance with the invention.

Referring to the drawings in particular, the invention embodied therein as shown in FIGS. 1—3 comprises a bucket conveyor generally designated 50 which includes at least one drive pulley or set of drive pulleys 3 and 4 which cooperate with a pair of set guide pulleys 5 and 6. The construction includes endless traction cable means in the form of cables or ropes 1 and 2 which are guided over the drive and guide pulleys 3, 4, 5 and 6. A plurality of buckets or conveyor troughs 7 each have axles 9 with drive pulleys 9*a* carried thereby such as by being affixed to the axle 9 or rotatable in respect thereto. The cables are trained around the respective drive pulleys and guide pulleys and they are trained around guide pins 10 and 10' arranged on respective opposite sides of the pulleys 9a of each bucket or conveyor trough 7.

The traction ropes or cables 1 and 2 are driven by driving pulleys 3 and 4 and conducted over guide pulleys 5 and 6. Conveyor troughs or buckets 7 are secured on traction ropes 1 and 2 by means of parts 8 of traction ropes 1 and 2 which are bent off from the direction of traction about conveyor trough axle or pivot pulley 9 and guide pins 10. This type of fastening has the advantage that the traction ropes 1 and 2 can pass unhindered between the driving and guide pulleys 3, 4, 5 and 6. Crosshead guides 11 and 12 define outer curved guides on which run rollers 13 which are arranged on a pulley 9a mounted or fixed on an axle 9 of conveyor troughs 7. Driving pulleys 3,4 have grooves 14 which can be lined, if necessary, with a driving pulley lining 15.

Figure 4:
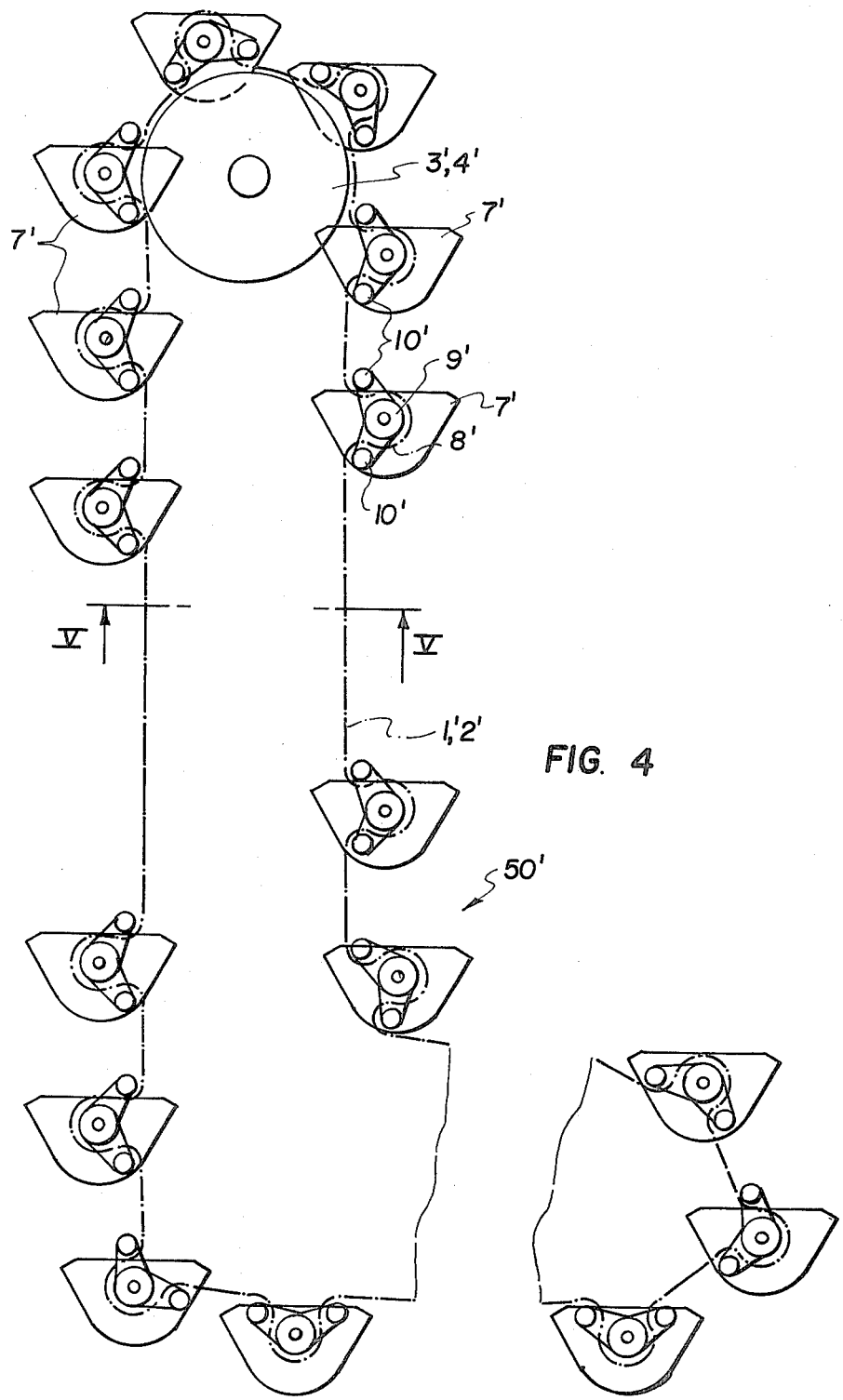
FIG. 4 is a view similar to FIG. 1 of another embodiment of the invention.
Figure 5:
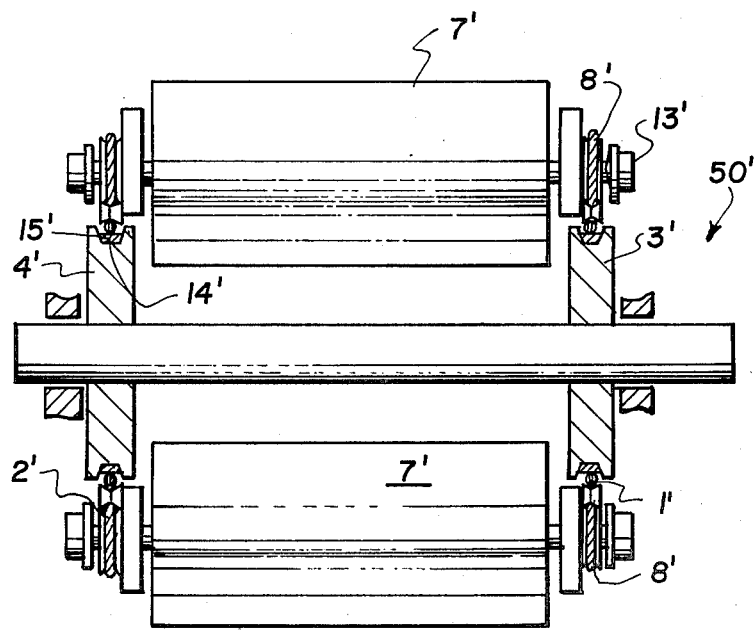
FIG. 5 is a section taken along the line V—V of FIG. 4.

FIG. 4 shows a pendulum bucket conveyor generally designated 50' with parts similar to FIG. 1 designated with the same numerals but with a prime added. As it can be seen from the drawing, the lines can have any direction, as shown in the bottom part of the drawing, also horizontal. The arrangement, fastening and guidance are effected, as described and shown in FIG. 1 to 3 only with the difference that the conveyor troughs 7' are suspended on pulleys 9a' which pivot or swing on their axle 9'. The deflection is effected over guide pulleys (not shown) at the various deflection points. The conveyor troughs 7' are arranged between the driving and the guide pulleys 3', 4', 5', 6' can be unloaded by centrifugal or by internal discharge.

While specific embodiments of the invention have been shown and described in detail to illustrate the application of the principles of the invention, it will be understood that the invention may be embodied otherwise without departing from such principles.

What is claimed is:

1. A bucket conveyor, comprising a drive pulley, at least one guide pulley, endless traction cable means engaged over said drive pulley and said guide pulley, a conveyor trough having an axle, a bucket pulley on said axle, a guide pin on said trough on each side of said axle, said endless traction cable means including a cable trained around each guide pin having a loop engaged over said bucket pulley between said pins to secure said bucket pulley to said cable, wherein said bucket pulley is rotatably mounted on said axle.

2. A bucket conveyor according to claim 1, wherein said conveyor trough is arranged between lengths of said traction cable.

3. A bucket conveyor according to claim 1, wherein said drive pulley is grooved.

4. A bucket conveyor according to claim 1, wherein said drive pulley has a groove therein and a lining in said groove.

5. A bucket conveyor according to claim 1, wherein said endless traction cable means comprises a rope.

6. A bucket conveyor, comprising a drive pulley, at least one guide pulley, a pair of endless traction ropes engaged over said drive pulley and said guide pulley, a conveyor trough having axles extending from each side thereof, a bucket pulley on each of said axles, guide pins on said trough adjacent each of said axles, defining a spacing between each of said guide pins and said axle, one of said endless traction ropes trained around each guide pin and engaged over said bucket pulley through said spacing to receive said trough to said rope, said conveyor trough being arranged between said traction ropes, and said bucket pulley being rotatably mounted in said bucket axle.

* * * * *